(12) United States Patent
Kang et al.

(10) Patent No.: US 8,235,649 B2
(45) Date of Patent: Aug. 7, 2012

(54) BLOWER FOR VEHICLES

(75) Inventors: Boksun Kang, Daejeon-si (KR);
Yongsang Kim, Daejeon-si (KR);
Yonghung Lee, Daejeon-si (KR);
Yuncheol Park, Daejeon-si (KR)

(73) Assignee: Halla Climate Control Corporation, Daejeon-si (KR)

( * ) Notice: Subject to any disclaimer, the term of this patent is extended or adjusted under 35 U.S.C. 154(b) by 1163 days.

(21) Appl. No.: 12/080,122

(22) Filed: Apr. 1, 2008

(65) Prior Publication Data

US 2008/0253879 A1    Oct. 16, 2008

(30) Foreign Application Priority Data

Apr. 12, 2007    (KR) .................. 10-2007-0036142
Mar. 17, 2008    (KR) .................. 10-2008-0024214

(51) Int. Cl.
*B60H 1/00*    (2006.01)

(52) U.S. Cl. .... 415/102; 415/191; 454/139; 417/423.14

(58) Field of Classification Search ................. 415/101, 415/102, 121.2, 151, 191, 204, 206; 454/139, 454/141, 143, 145, 156–158; 417/423.1, 417/423.14, 278

See application file for complete search history.

(56) References Cited

U.S. PATENT DOCUMENTS 7,682,233 B2 *   3/2010   Wang et al. ................... 454/160
2006/0285967 A1   12/2006   Wang et al.

FOREIGN PATENT DOCUMENTS

| JP | 62-268720 | 11/1987 |
| JP | H05-10016 | 9/1993 |
| KR | 10-2004-0108454 | 12/2004 |

* cited by examiner

*Primary Examiner* — Edward Look
*Assistant Examiner* — Jesse Prager
(74) *Attorney, Agent, or Firm* — Fulbright & Jaworski L.L.P.

(57) ABSTRACT

The present invention relates to a blower for vehicles, which includes guide walls formed on a bypass passageway formed between a scroll case and an outer case to send the indoor air and the outdoor air to a lower suction opening of the scroll case, thereby reducing suction noise by guiding a uniform flow of air introduced into the lower suction opening, preventing deformation of the outer case, and preventing a droop of the air filter by supporting a lower portion of an air filter when an intake duct injection-molded in a vertically parted mold is applied thereto.

11 Claims, 11 Drawing Sheets

Prior Art

Prior Art

Prior Art

Prior Art

BLOWER FOR VEHICLES

This application claims priority from Korean Patent Application No. 10-2007-0036142 filed Apr. 12, 2007 and Korean Patent Application No. 10-2008-0024214 filed Mar. 17, 2008, 2008, each of which are incorporated herein by reference in their entireties.

BACKGROUND OF THE INVENTION

1. Field of the Invention

The present invention relates to a blower for vehicles, and more particularly, to a blower for vehicles, which includes guide walls formed on a bypass passageway formed between a scroll case and an outer case to send the indoor air and the outdoor air to a lower suction opening of the scroll case, thereby reducing suction noise by guiding an uniform flow of air introduced into the lower suction opening, preventing deformation of the outer case, and preventing a droop of the air filter by supporting a lower portion of an air filter when an intake duct injection-molded in a vertically parted mold is applied thereto.

2. Background Art

In general, an air conditioner 1 for a vehicle is a device which is adapted to allow indoor air and outdoor air of the vehicle to be introduced thereto, heat or cool the introduced air, and send the heated or cooled air to the inside of the vehicle to thereby cool or heat the inside of the vehicle. As shown in FIG. 1, the air conditioner includes: a blower 10 having an indoor air inlet 21 and an outdoor air inlet 22 formed on the upper portion thereof, an intake door 23 for selectively opening and closing the indoor air inlet 21 and the outdoor air inlet 22, and a blower fan 31 for forcedly sending the indoor air and the outdoor air toward an inlet 43 of an air-conditioning case 40; and the air-conditioning case 40 having the inlet 43 for introducing the air blown from the blower 10 thereto and an outlet 44 for discharging the air, wherein an evaporator 41 and a heater core 42 are mounted in the air-conditioning case 40 in order in a state where they are spaced apart from each other at a predetermined interval.

Here, the intake door 23 adopts one of various types, for instance, a flat type, a dome-type, to which air pressure is applied a little, a cylindrical type, a hemispherical type, and so on.

FIG. 2 is a cross-sectional view of a blower for vehicles, to which a typical unidirectional suction type blower fan is applied. As shown in FIG. 2, the blower 10 includes: a scroll case 30 having a discharge port 35 formed on a side thereof and connected to an air-conditioning case 40, the scroll case 30 being opened at an upper portion thereof; an intake duct 20 mounted on the upper portion of the scroll case 30, the intake duct 20 having an indoor air inlet 21 and an outdoor air inlet 22 for respectively introducing the indoor air and the outdoor air and an intake door 23 for selectively opening and closing the indoor air inlet 21 and the outdoor air inlet 22; a suction opening 37 adapted to provide an air suction passageway between the intake duct 20 and the scroll case 30; a blower fan 31 rotatably mounted on the scroll case 30; and a motor 39 mounted below the scroll case 30 to rotate the blower fan 31 and connected with the blower fan 31. In FIG. 2, the reference numeral 38 designates an air filter 38 for filtering foreign matters contained in the air sucked to the intake duct 20, and the air filter 38 can be mounted selectively.

In addition, the intake door 23 is actuated by a cable (not shown) and an actuator (not shown), which are mounted separately.

Furthermore, the blower fan 31 adopts a unidirectional suction type structure, and hence, sucks air from one axial direction, namely, from the suction opening 37 and discharges it in a radial direction according to the rotation thereof. The blower fan 31 includes a hub plate 32 connected to a shaft of the motor 39, a plurality of blades 33 radially arranged along the edge of an upper face of the hub plate 32, and a support ring 34 for connecting and supporting upper ends of the blades 33 with one another.

Moreover, the hub plate 32 is generally concaved toward the inside (namely, upper portion) of a space formed by the blades 33, and thereby, the motor 39 is connected to the hub plate 32 in a state where a portion of the motor 39 is inserted into the space.

Accordingly, when the blower fan 31 is rotated by driving of the motor 39, the indoor air or the outdoor air is introduced through the suction opening 37 in the axial direction of the blower fan 31 after passing through the indoor air inlet 21 or the outdoor air inlet 22, which is selectively opened according to a control of an opening level of the intake door 23, flows along an inclined upper face of the hub plate 32, and then, is discharged in the radial direction of the blower fan 31. The air is blown to the inside of the air-conditioning case 40 through the discharge port 35 in a state where the air is gradually increased in pressure and volume while flowing along a side wall of the scroll case 30.

However, the blower 10, to which the unidirectional suction type blower fan 31 is applied, has a problem in that an air flow distribution is not uniform in the upper and lower parts of the blower 10 since the air is mainly discharged along an inclined surface of the hub plate 31 as shown in FIG. 2 when the air is discharged from the blower fan 31 in the radial direction.

In addition, referring to FIG. 3, an air flow structure formed at a cut-off area 36 where a scroll portion 30a and the discharge port 35 of the scroll case 30 meet with each other will be described. At the cut-off area 36, the air directly flowing toward the discharge port 35 after being discharged from the blower fan 31 in the radial direction collides against and is mixed with the air flowing toward the discharge port 35 along the side wall of the scroll portion 30a after being discharged from the blower fan 31 in the radial direction to thereby generate a turbulent flow. As described above, when the air flow distribution is not uniform and the turbulent flow is generated, an air volume is reduced and noise is generated greatly.

In order to solve the problems of the typical blower 10, to which the unidirectional suction type blower fan 31 is applied, a bidirectional suction type blower for sucking and discharging air bidirectionally has been proposed to increase the air volume, reduce noise, and perform a two-layer air flow.

Japanese Utility Model Laid-open Publication No. Hei 5-10016 discloses an example of the bidirectional suction type blower. As shown in FIG. 4, the bidirectional suction type blower includes: a scroll case 30 having upper and lower suction openings 37a and 37b formed at upper and lower face thereof and a discharge port (not shown) formed on a side thereof; a bidirectional suction type blower fan 31 rotatably mounted on the scroll case 30 and having a plurality of blades 33a and 33b integrally formed on upper and lower portions of a hub plate 32 and opposed to each other; an outer case 50 mounted on the outer surface of the scroll case 30 and having a bypass passageway 51 formed between the outer case 50 and the scroll case 30 for sending air toward the lower suction opening 37b; an intake duct 20 formed on an upper end of the outer case 50 for sending air toward the upper and lower suction openings 37a and 37b, the intake duct 20 having an outdoor air inlet 22 and a plurality of indoor air inlets 21 formed on an upper portion thereof and an intake door 23 mounted therein for opening and closing the indoor air inlets 21 and the outdoor air inlet 22; and a motor 39 connected to the hub plate 32 through the lower suction opening 37b to rotate the bidirectional suction type blower fan 31.

In the meantime, on a lower portion of the outer case 50 mounted are a plurality of indoor air inlets 21 and a door 23a for opening and closing the indoor air inlets 21.

According to the blower shown in FIG. 4, in an outdoor air inflow mode, in a state where all indoor air inlets 21 are closed but only the outdoor air inlet 22 is opened, the outdoor air is distributably sucked toward the upper and lower suction openings 37a and 37b. Furthermore, in an indoor air inflow mode, in a state where the outdoor air inlet 22 is closed but all of the indoor air inlets 21 are opened, the indoor air is distributedly sucked toward the upper and lower suction openings 37a and 37b. Additionally, in an indoor and outdoor air inflow mode, in a state where the outdoor air inlet 22 is partially opened and some of the indoor air inlets 21 are selectively opened, the indoor air and the outdoor air are mixed with each other and sucked toward the upper suction opening 37a and the indoor air is sucked toward the lower suction opening 37b.

In the blower, some of the air introduced through the indoor and outdoor air inlets 21 and 29 of the intake duct 20 is sucked toward the lower suction opening 37b through the bypass passageway 51, and in this instance, noise is generated since a flow of the air sucked toward the lower suction opening 37b through the bypass passageway 51 is not uniform.

Furthermore, since the outer case 50 is separated apart outwardly from the scroll case 30 at a predetermined interval by the bypass passageway 51, the outer case 50 is transformed.

Meanwhile, if the air filter 38 is mounted between the outer case 50 and the intake duct 20, a horizontal support structure (38a in FIG. 2) is formed on a bottom face of the intake duct 20 to support a lower portion of the air filter 38. In this instance, the air filter support structure 38a can be formed on the intake duct 20, which is injection-molded in a horizontally parted mold, but not be formed on an intake duct, which is injection-molded in a vertically parted mold. i.e., in a mold having horizontal parting line, due to a feature of the mold. Accordingly, even though the intake duct 20 injection-molded in the horizontally parted mold may generate leak and noise due to ununiformity of a sealed portion at the parting line portion, the horizontally parted mold must be used since it can mold the support structure 38a for the lower portion of the air filter.

Of course, if the intake duct is injection-molded in the vertically parted mold, since the support structure 38a for the lower portion of the air filter cannot be molded, the lower portion of the air filter 38 droops.

SUMMARY OF THE INVENTION

Accordingly, the present invention has been made to solve the above-mentioned problems occurring in the prior arts, and it is an object of the present invention to provide a blower for vehicles, which includes guide walls formed on a bypass passageway formed between a scroll case and an outer case to send the indoor air and the outdoor air to a lower suction opening of the scroll case, thereby reducing suction noise by guiding a uniform flow of air introduced into the lower suction opening, preventing deformation of the outer case, and preventing a droop of the air filter by supporting a lower portion of an air filter when an intake duct injection-molded in a vertically parted mold is applied thereto.

To accomplish the above object, according to the present invention, there is provided a blower for vehicles including: a scroll case having upper and lower suction openings formed on upper and lower faces thereof and a discharge port formed on a side thereof; a blower fan rotatably mounted inside the scroll case and having a plurality of blades mounted therein; an outer case mounted outside the scroll case and having a bypass passageway formed between the scroll case and the outer case for sending air toward the lower suction opening; and an intake duct coupled to an upper end of the outer case, the intake duct having an indoor air inlet and an outdoor air inlet formed on an upper portion thereof and an intake door mounted inside the intake duct, the indoor and outdoor air inlets being opened and closed by the intake door to thereby send the indoor air or the outdoor air to the upper and lower suction openings, characterized in that a plurality of guide walls are formed on the bypass passageway so as to connect the scroll case and the outer case with each other to divide the bypass passageway into a plurality of zones.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Reference will be now made in detail to the preferred embodiment of the present invention with reference to the attached drawings.

In the present invention, description of the same configuration and action as the prior arts will be omitted.

Figure 1:
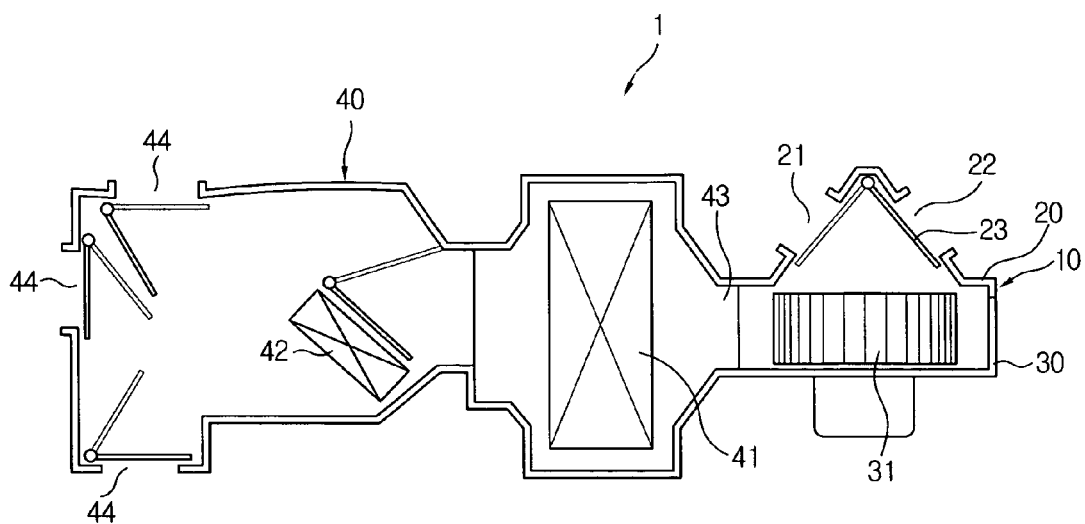
FIG. 1 is a schematic diagram of an air conditioner for vehicles according to a prior art.
Figure 2:
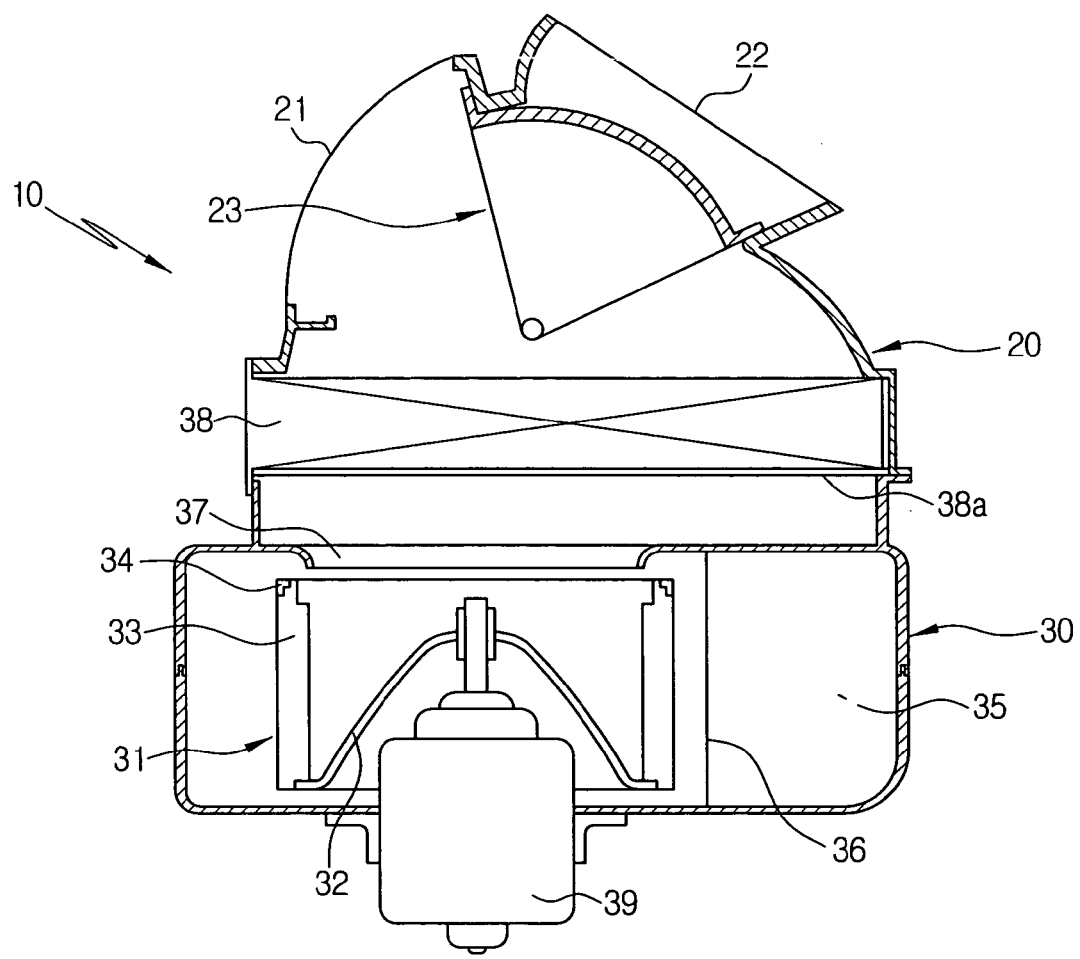
FIG. 2 is a cross-sectional view of a blower for vehicles, to which a unidirectional suction type blower fan according to a prior art is applied.
Figure 3:
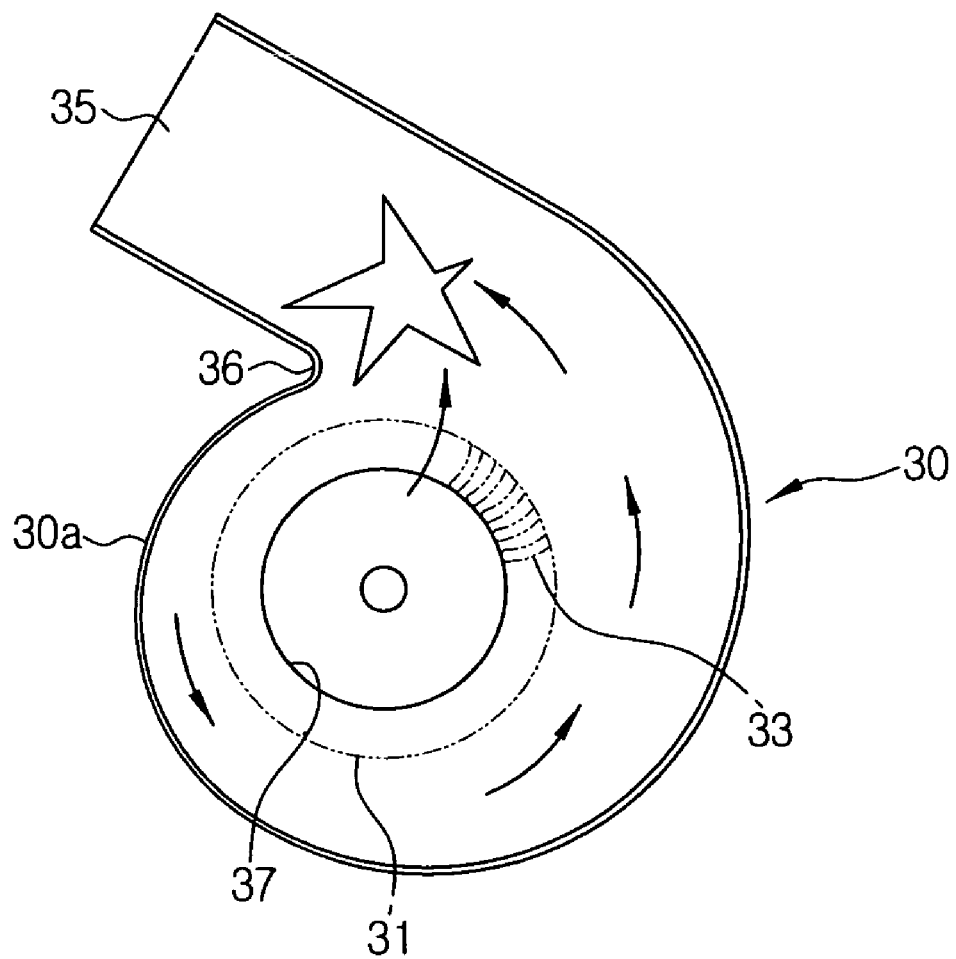
FIG. 3 is a plan view showing a scroll case of FIG. 2.
Figure 4:
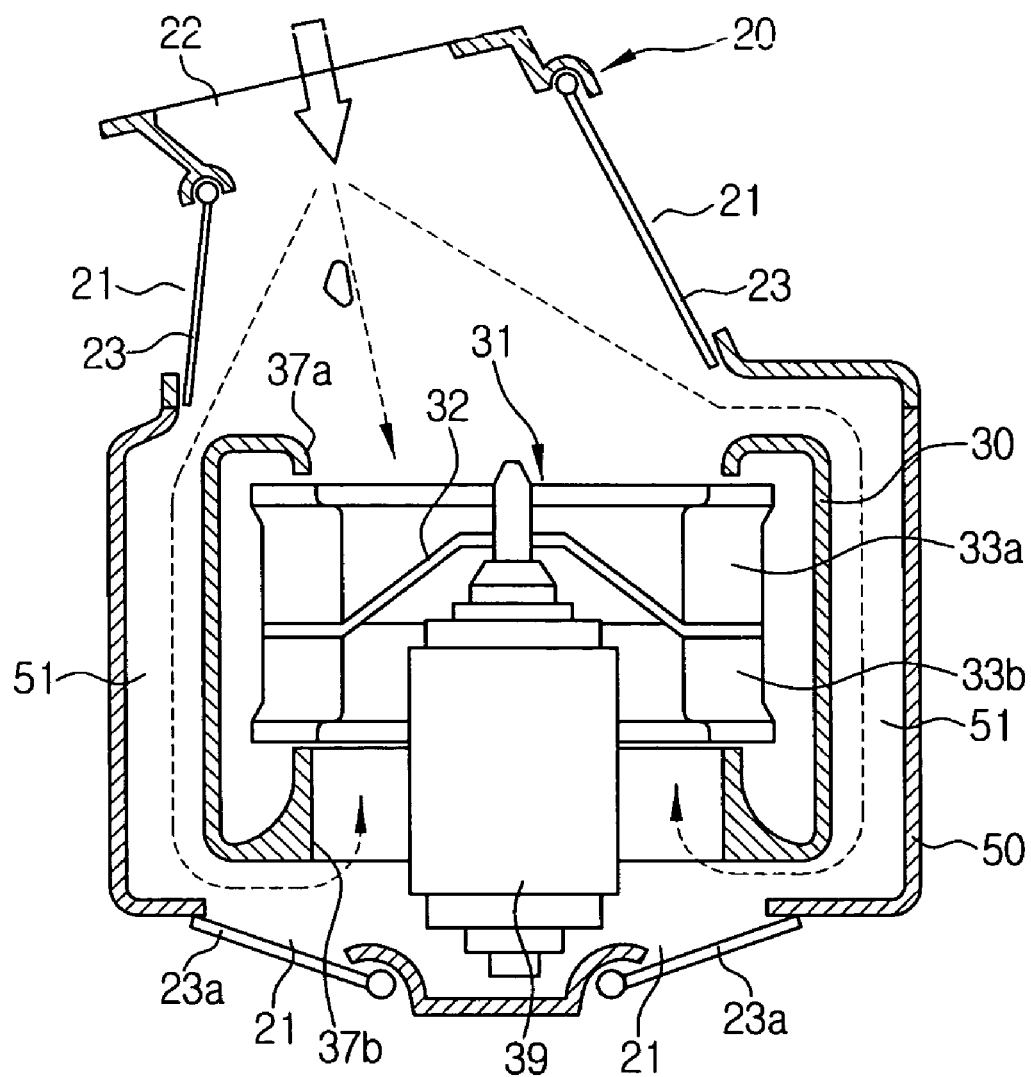
FIG. 4 is a cross-sectional view of a blower for vehicles, to which a bidirectional suction type blower fan according to a prior art is applied.
Figure 5:
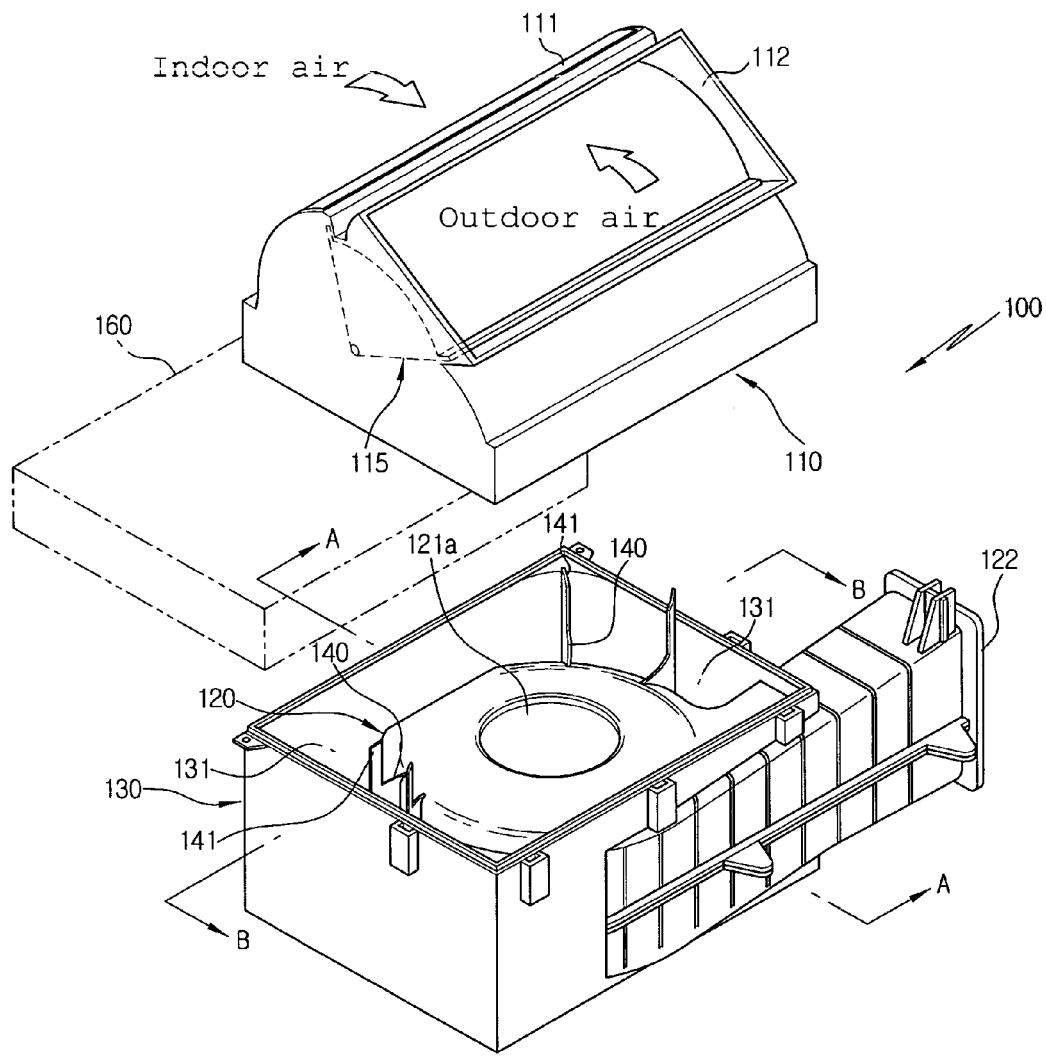
FIG. 5 is an exploded perspective view of a blower for vehicles according to a preferred embodiment of the present invention.
Figure 6:
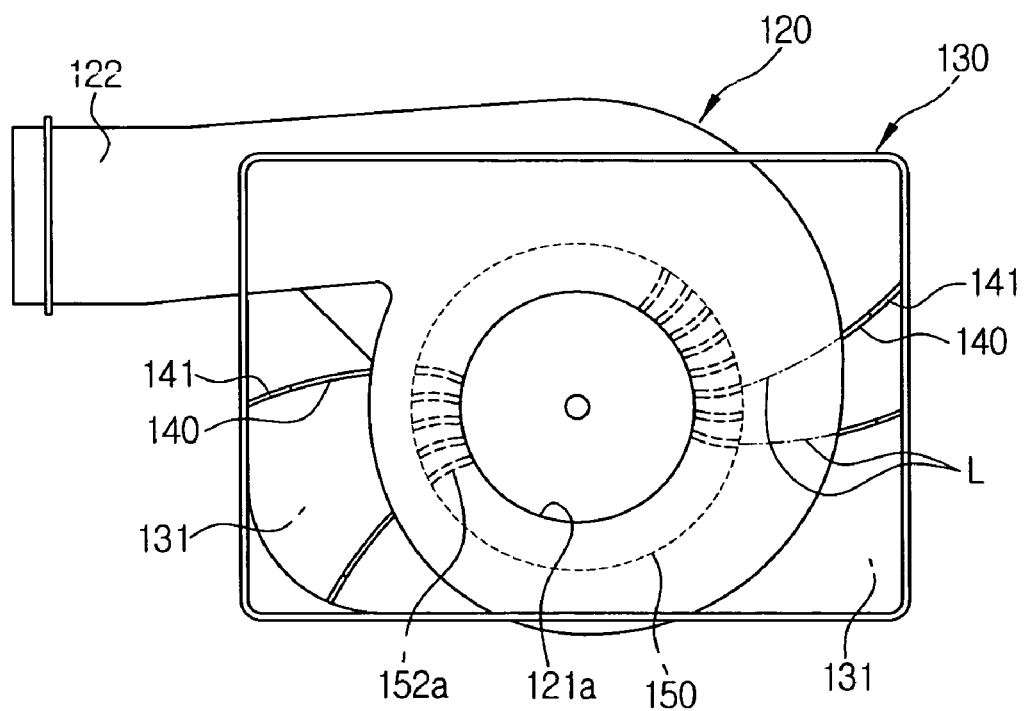
FIG. 6 is a plan view showing a state where an intake duct is omitted from the blower for vehicles according to the present invention.
Figure 7:
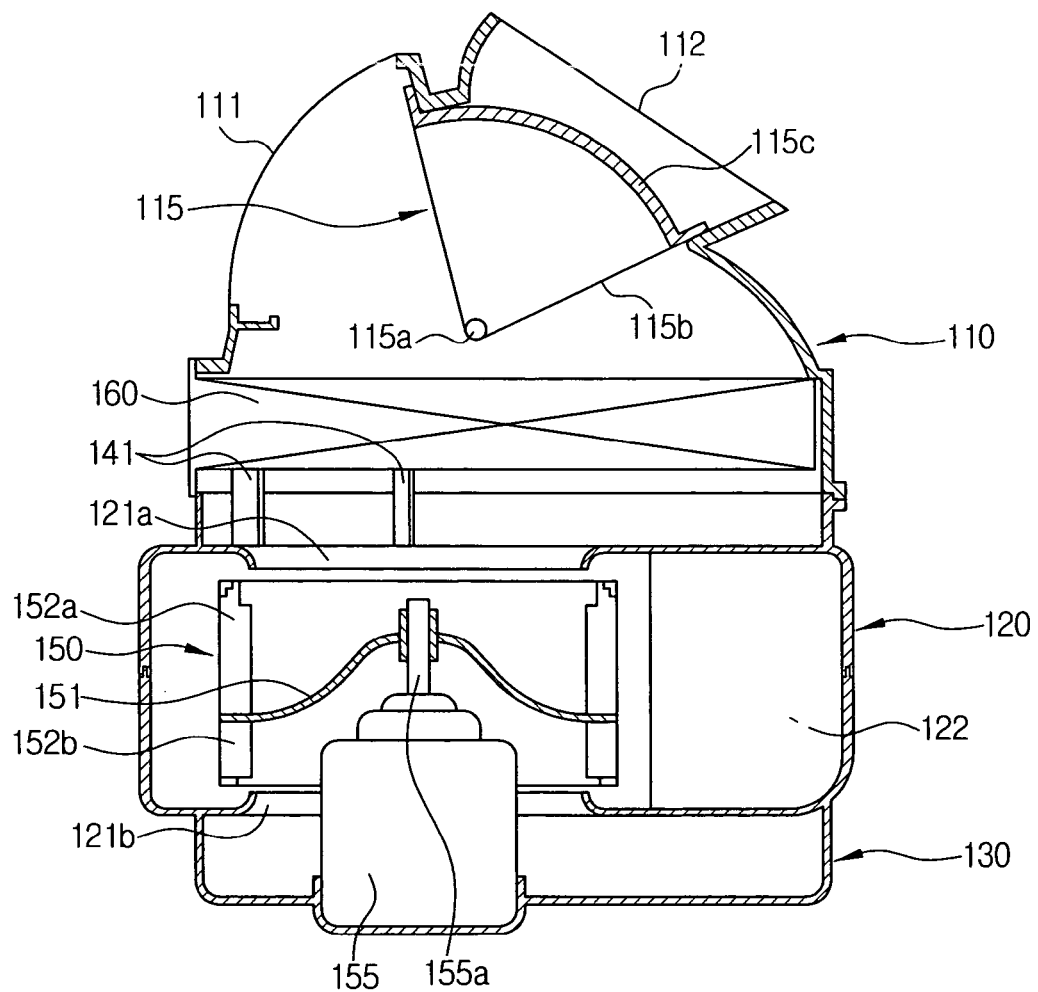
FIG. 7 is a cross-sectional view taken along the line of A-A of FIG. 5.
Figure 8:
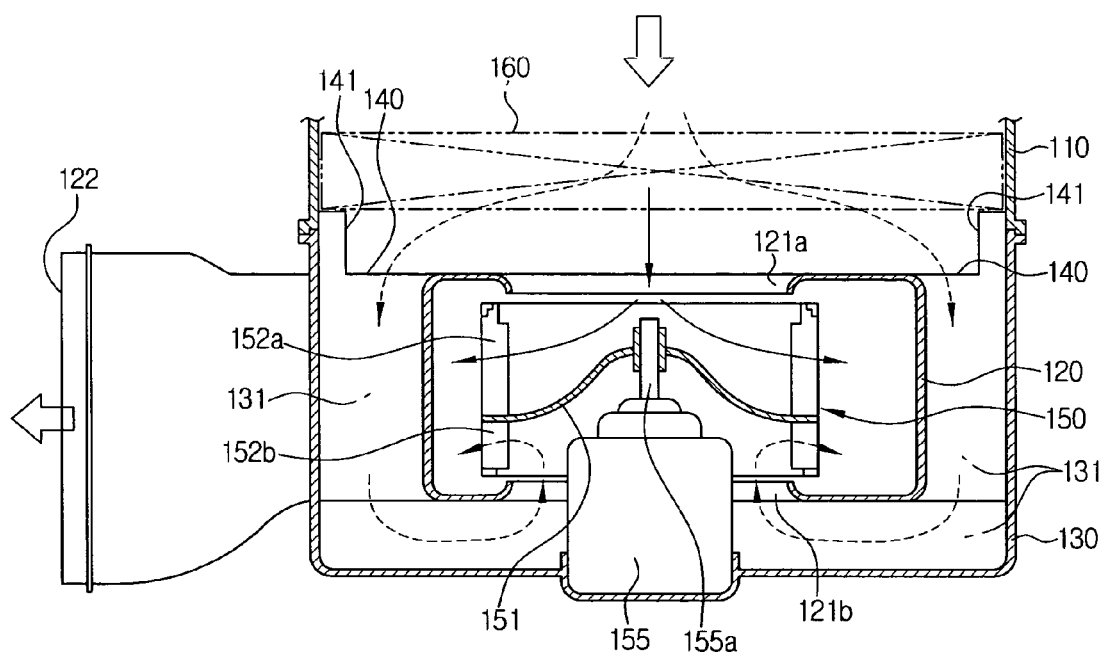
FIG. 8 is a cross-sectional view taken along the line of B-B of FIG. 5.
Figure 9:
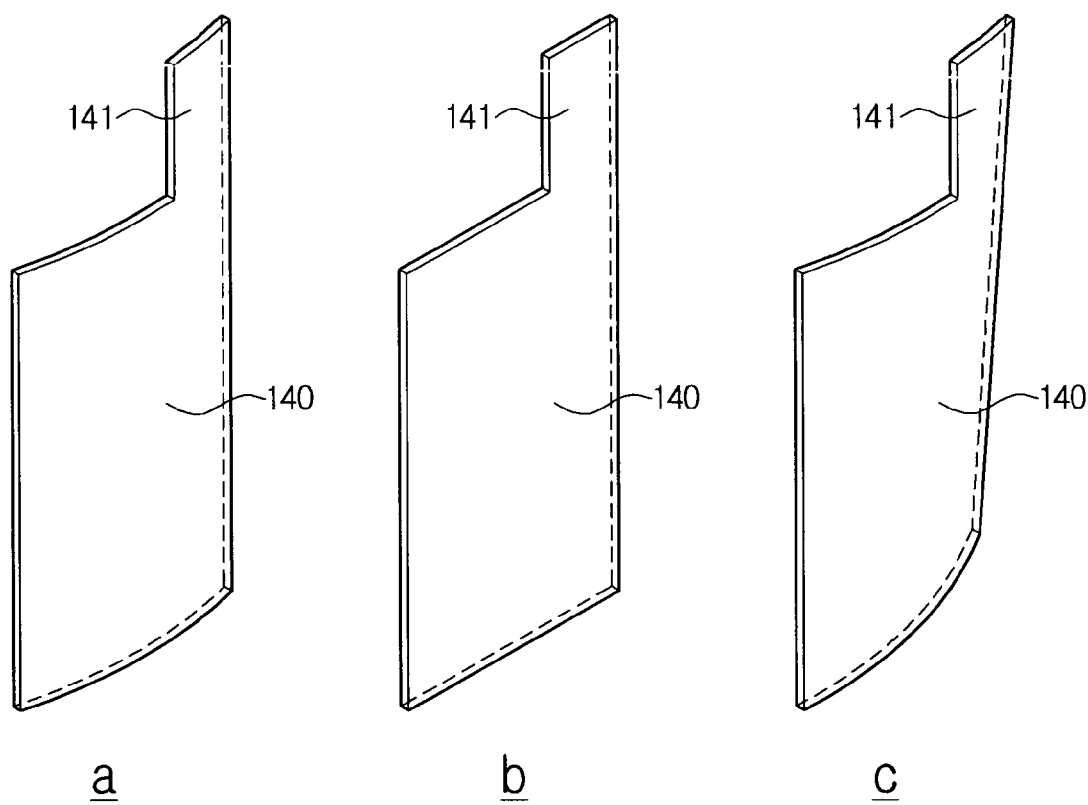
FIG. 9 is a view showing various examples of a guide wall of the blower according to the present invention.

FIG. 5 is an exploded perspective view of a blower for vehicles according to a preferred embodiment of the present invention, FIG. 6 is a plan view showing a state where an intake duct is omitted from the blower for vehicles according to the present invention, FIG. 7 is a cross-sectional view taken along the line of A-A of FIG. 5, FIG. 8 is a cross-sectional view taken along the line of B-B of FIG. 5, and FIG. 9 is a view showing various examples of a guide wall of the blower according to the present invention.

As shown in the drawings, the blower 100 according to the present invention includes a scroll case 120, a bidirectional suction type blower fan 150, an outer case 130, and an intake duct 110.

The bidirectional suction type blower fan 150 is rotatably mounted inside the scroll case 120, and the scroll case 120 includes upper and lower suction openings 121a and 121b formed on upper and lower faces thereof and a discharge port 122 formed on a side thereof and connected to an air-conditioning case 40.

The bidirectional suction type blower fan 150 includes a plurality of blades 152a and 152b integrally formed on upper and lower edges of a hub plate 151 connected and coupled to a motor shaft 155a of a motor 155.

In this instance, each of the blades 152a and 152b has a curved surface.

Accordingly, the bidirectional suction type blower fan 150 can simultaneously suck air existing in upper and lower axial directions from the hub plate 151. That is, when the blower fan 150 is rotated, the bidirectional suction type blower fan 150 can simultaneously suck the air through the upper and lower suction openings 121a and 121b.

Furthermore, the outer case 130 is opened at the upper portion thereof and sealed at the lower portion thereof and integrally formed outside the scroll case 120 in such a way as to be spaced apart from the scroll case 120 at a predetermined interval. A bypass passageway 131 is formed between the outer case 130 and the scroll case 120 in such a way as to send the air toward the lower suction opening 121b.

That is, the bypass passageway 131 is formed between the outer case 130 and the scroll case 120 in such a way that the outer case 130 is spaced apart from the circumference and the lower face of the scroll case 120 at the predetermined interval.

In the meantime, the motor 155 is mounted beneath the outer case 130, and the motor shaft 155a of the motor 155 is connected with the hub plate 151 of the blower fan 150 to thereby rotate the blower fan 150.

The intake duct 110 is coupled to an upper end of the outer case 130, and includes an indoor air inlet 111 and an outdoor air inlet 112 formed on an upper portion thereof and an intake door 115 rotatably mounted inside the intake duct 110 for selectively opening and closing the indoor and outdoor air inlets 111 and 112.

The intake door 115 is constructed of a dome-like type, and includes rotary shafts 115a rotatably coupled to both side walls of the intake duct 110, a curved plate 115c spaced apart from the rotary shafts 115a in a radial direction at a predetermined interval for opening and closing the indoor and outdoor inlets 111 and 112, and side plates 115b for connecting both ends of the curved plate 115c to the rotary shafts 115a.

The dome-like intake door 115 has sealed portions formed on both rotational edge portions abutting against the intake duct 110.

Meanwhile, the intake door 115 may adopt not only the dome-like type but also one of various types, such as a flat type, a cylindrical type, a hemi-spherical type, and so on.

In addition, an air filter 160 is mounted between the outer case 130 and the intake duct 110 for filtering impurities contained in the air introduced into the blower through the indoor and outdoor air inlets 111 and 112.

So, in an indoor air inflow mode, the intake door 115 opens the indoor air inlet 111 and closes the outdoor air inlet 112. In this instance, some of the indoor air introduced through the indoor air inlet 111 by the operation of the blower fan 150 is sucked to the inside of the scroll case 120 through the upper suction opening 121a and the remainder is sucked to the inside of the scroll case 120 through the bypass passageway 131 and the lower suction opening 121b, and then, they are sent to the inside of the air-conditioning case 40.

Furthermore, in an outdoor air inflow mode, the intake door 115 closes the indoor air inlet 111 and opens the outdoor air inlet 112. In this instance, some of the outdoor air introduced through the outdoor air inlet 112 by the operation of the blower fan 150 is sucked to the inside of the scroll case 120 through the upper suction opening 121a and the remainder is sucked to the inside of the scroll case 120 through the bypass passageway 131 and the lower suction opening 121b, and then, they are sent to the inside of the air-conditioning case 40.

In the blower 100 according to the present invention, guide walls 140 are formed on the bypass passageway 131 so as to connect the scroll case 120 and the outer case 130 with each other in order to divide the bypass passageway 131 into a plurality of zones.

The guide wall 140 has a curved surface, and in this instance, it is preferable that the guide wall 140 is formed on an extension line (L) in a curvature direction of the blades 152a and 152b of the blower fan 150. That is, the bypass passageway 131 is formed in the same direction as the blades 152a and 152b having the curved surfaces.

Moreover, the guide wall 140 extends along an air flow direction inside the bypass passageway 131. Here, the divided zones of the bypass passageway (131) are formed so that a flow of air is blocked therebetween.

As described above, a plurality of the guide walls 140 are formed on the bypass passageway 131 to divide the bypass passageway 131 into a plurality of the zones, whereby the air flowing along the bypass passageway 131 does not lean upon one side.

That is, the volume of the air, which passes through the plural zones of the bypass passageway 131 divided by the guide walls 140 gets uniform to thereby make the flow of the air uniform.

In this instance, in order to uniformly keep the volume of the air passing through the divided zones of the bypass passageway 131, it is preferable that a rapid air flow area of the divided zone of the bypass passageway 131 is relatively smaller in cross section than a slow air flow area of the divided zone of the bypass passageway 131.

That is, through a change in a mounting place of the guide wall 140, the rapid air flow area has a relatively smaller cross section in an air passing area, but the slow air flow area has a relatively larger cross section in the air passing area, whereby the volume of the air passing through the divided zones of the bypass passageway 131 can be kept nearly uniformly.

Hence, when some of the air introduced through the indoor and outdoor air inlets 111 and 112 of the intake duct 110 flows to the lower suction opening 121b through the bypass passageway 131, the guide walls 140 formed in the same direction as the blades 152a and 152b serve to lead and guide the air flowing along the bypass passageway 131, whereby the flow of the air gets uniform to thereby reduce suction noise.

Furthermore, the guide wall 140 serves to support the outer case 130 outwardly spaced apart from the scroll case 120, whereby a deformation of the outer case 130 can be prevented and rigidity of the outer case 130 is reinforced.

FIG. 9 illustrates various examples of the guide walls 140, wherein FIG. 9(a) illustrates the guide wall 140 having the curved surface as described above, FIG. 9(b) illustrates the guide wall 140 having a plane surface, and FIG. 9(c) illustrates the guide wall 140 having different shapes along the air flow direction of the bypass passageway 131.

Of course, FIG. 9 shows some examples of the guide walls 140, and guide walls of other various shapes can be applied to the present invention.

In the meantime, as shown in FIG. 9(c), if the guide wall 140 has different upper and lower shapes bent along the air flow direction of the bypass passageway 131, the flow of the air passing the divided zones of the bypass passageway 131 can be controlled.

Moreover, a filter support member 141 protrudes from an upper face of the guide wall 140 for supporting a lower portion of the air filter 160 mounted between the outer case 130 and the intake duct 110 to prevent the droop of the air filter 160.

That is, the intake duct 110 is injection-molded in a horizontally parted mold or a vertically parted mold. In case of the intake duct injection-molded in the horizontally parted mold, it may generate leak or noise when the dome-like intake door 115 is operated due to ununiformity of the sealed portion at a parting line portion of the mold.

Additionally, in case of the intake duct 110 injection-molded in the vertically parted mold, it can solve the problem of sealability, which is a demerit of the intake duct injection-molded in the horizontally parted mold, but cannot form the support structure for the lower portion of the air filter 160 on the bottom face of the intake duct 110 due to the feature of the vertically parted mold. For your reference, the intake duct injection-molded in the horizontally parted mold can horizontally form the support structure for the lower portion of the air filter 160 on the bottom face of the intake duct 110.

Accordingly, in the present invention, the filter support member 141 protruding from the upper face of the guide wall 140 can serve as the support structure for the lower portion of the air filter, which cannot be formed by the intake duct injection-molded in the vertically parted mold. So, if the intake duct 110 injection molded in the vertically parted mold to enhance sealability is applied to the present invention, the filter support member 141 can support the lower portion of the air filter 160 to thereby prevent the droop of the air filter 160.

Figure 10:
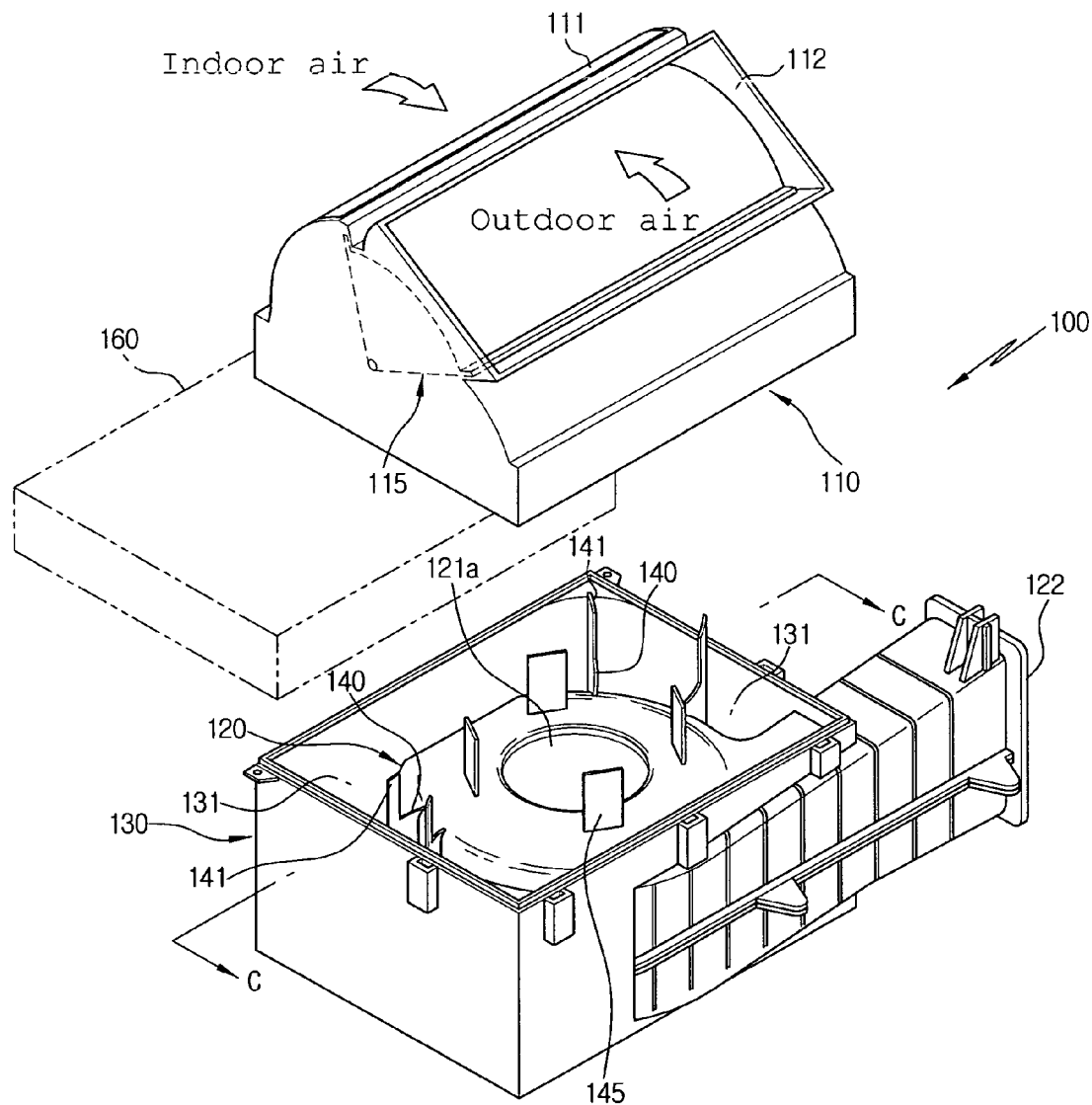
FIG. 10 is an exploded perspective view of a blower for vehicles according to another preferred embodiment of the present invention.
Figure 11:
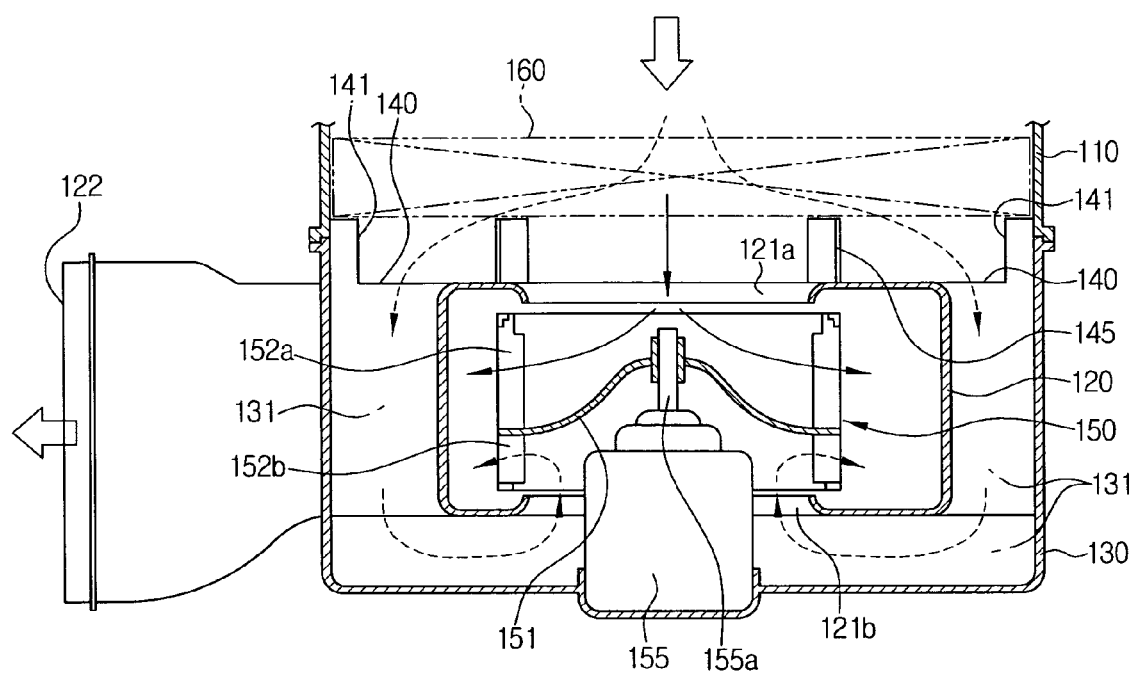
FIG. 11 is a cross-sectional view taken along the line of C-C of FIG. 10.

FIG. 10 is an exploded perspective view of a blower for vehicles according to another preferred embodiment of the present invention, and FIG. 11 is a cross-sectional view taken along the line of C-C of FIG. 10. As shown in the drawings, an auxiliary filter support member 145 protrudes from the upper face of the scroll case 120 to additionally support the lower portion of the air filter 160.

Accordingly, the filter support member 141 supports the lower edge of the air filter 160 and the auxiliary filter support member 145 supports the center of the lower portion of the air filter 160, whereby the air filter 160 can be supported in more stable.

Hereinafter, the operation of the blower for the vehicles according to the present invention will be described.

First, when the motor 155 is driven and an air suction mode is set by the operation of the intake door 115, the indoor or the outdoor is sucked to the inside of the intake duct 110 through the indoor air inlet 111 or the outdoor air inlet 112 by means of a suction force obtained by the rotation of the bidirectional suction type blower fan 150.

Continuously, some of the air sucked to the inside of the intake duct 110 flows to the inside of the upper blades 152a through the upper suction opening 121a of the scroll case 120, and the remainder flows to the inside of the lower blades 152b through the bypass passageway 131 and the lower suction opening 121b.

In the above air flow process, when some of the air sucked to the inside of the intake duct 110 flows to the lower suction opening 121b through the bypass passageway 131, the flow of the air gets uniform by leading and guide of the plural glide walls 140 formed on the bypass passageway 131 to thereby reduce noise.

As described above, the blower according to the present invention can reduce suction noise by guiding the uniform flow of the air introduced to the lower suction opening and prevent deformation of the outer case since the guide walls are formed on the bypass passageway formed between the scroll case and the outer case.

Furthermore, the blower according to the present invention can prevent the droop of the air filter by supporting the lower portion of the air filter when the intake duct injection-molded in the vertically parted mold is applied since the filter support member is formed on the guide wall.

While the present invention has been described with reference to the particular illustrative embodiment, it is not to be restricted by the embodiment but only by the appended claims. It is to be appreciated that those skilled in the art can change or modify the embodiment without departing from the scope and spirit of the present invention.

What is claimed is:

1. A blower for vehicles including:
   a scroll case having upper and lower suction openings formed on upper and lower faces thereof and a discharge port formed on a side thereof;
   a blower fan rotatably mounted inside the scroll case and having a plurality of blades mounted therein;
   an outer case mounted outside the scroll case and having a bypass passageway formed between the scroll case and the outer case for sending air toward the lower suction opening;
   an intake duct coupled to an upper end of the outer case, the intake duct having an indoor air inlet and an outdoor air inlet formed on an upper portion thereof and an intake door mounted inside the intake duct, the indoor and outdoor air inlets being opened and closed by the intake door to thereby send the indoor air or the outdoor air to the upper and lower suction openings; and
   a plurality of guide walls formed on the bypass passageway so as to connect the scroll case and the outer case with each other to divide the bypass passageway into a plurality of zones.

2. The blower according to claim 1, wherein the guide wall has a curved surface.

3. The blower according to claim 2, wherein the guide wall is formed on an extension line in a curvature direction of the blades of the blower fan.

4. The blower according to claim 1, wherein the guide wall extends along an air flow direction inside the bypass passageway.

5. The blower according to claim 4, wherein the guide wall has different shapes according to the air flow direction of the bypass passageway.

6. The blower according to claim 1, wherein the divided zones of the bypass passageway are formed so that a flow of air is blocked therebetween.

7. The blower according to claim 1, wherein a rapid air flow area of the divided zone of the bypass passageway is relatively smaller in cross section than a slow air flow area of the divided zone of the bypass passageway.

8. The blower according to claim 1, wherein a filter support member protrudes from an upper face of the guide wall for supporting a lower portion of the air filter mounted between the outer case and the intake duct.

9. The blower according to claim 8, wherein the intake duct is injection-molded in a vertically parted mold.

10. The blower according to claim 8, wherein an auxiliary filter support member protrudes from the upper face of the scroll case for supporting the lower portion of the air filter.

11. The blower according to claim 9, wherein the intake door includes: rotary shafts rotatably coupled to both side walls of the intake duct; a curved plate spaced apart from the rotary shaft in a radial direction at a predetermined interval; and side plates for connecting both ends of the curved plate to the rotary shafts, the intake door having sealed portions formed at both rotational edge portions abutting against the intake duct.

* * * * *